United States Patent [19]

Kurakake et al.

[11] Patent Number: 4,873,476
[45] Date of Patent: Oct. 10, 1989

[54] ROBOT CONTROL APPARATUS FOR CONTROLLING A MANIPULATOR THROUGH A ROBOT ARM HAVING A PLURALITY OF AXES

[75] Inventors: Mitsuo Kurakake, Hino; Keiji Sakamoto; Takashi Iwamoto, both of Hachioji, all of Japan

[73] Assignee: Fanuc Ltd., Minamitsuru, Japan

[21] Appl. No.: 110,727

[22] PCT Filed: Mar. 14, 1987

[86] PCT No.: PCT/JP87/00162

§ 371 Date: Sep. 23, 1987

§ 102(e) Date: Sep. 23, 1987

[87] PCT Pub. No.: WO87/05721

PCT Pub. Date: Sep. 24, 1987

[30] Foreign Application Priority Data

Mar. 14, 1986 [JP] Japan ................................. 61-56433
Mar. 14, 1986 [JP] Japan ................................. 61-56434
Mar. 14, 1986 [JP] Japan ................................. 61-56435

[51] Int. Cl.[4] ............................................. B25J 9/12
[52] U.S. Cl. ............................. 318/568.22; 318/632; 901/9
[58] Field of Search ................. 318/568, 632, 568.22; 364/474, 513; 901/2, 9, 14, 23, 24, 48

[56] References Cited

U.S. PATENT DOCUMENTS

| | | | |
|---|---|---|---|
| 4,218,172 | 8/1980 | Freund | 901/9 X |
| 4,409,650 | 10/1983 | Noguchi | 318/568 X |
| 4,467,436 | 8/1984 | Chance et al. | 364/200 X |
| 4,507,738 | 3/1985 | Nozawa et al. | 318/568 X |
| 4,514,814 | 4/1985 | Evans | 364/474 |
| 4,530,062 | 7/1985 | Inaba et al. | 318/632 X |
| 4,549,276 | 10/1985 | Inaba et al. | 364/474 X |
| 4,594,670 | 6/1986 | Itoh | 318/632 X |
| 4,633,414 | 12/1986 | Yabe et al. | 901/2 X |

Primary Examiner—Bentsu Ro
Attorney, Agent, or Firm—Staas & Halsey

[57] ABSTRACT

A robot control apparatus has servo CPUs ($c_1$, $c_2$) provided in control loops of respective servomotors ($e_1$, $e_2$) for driving and controlling loads about plural drive axes ($\theta_1$, $\theta_2$) of a robot arm. Since these servo CPUs execute drive torque calculations necessary for servomotor control, the cost of the control apparatus can be reduced. Also provided is a shared RAM (b) capable of being accessed commonly by the servo CPUs. Information about other axes stored in the RAM is read out and, when current loop processing is not being carried out, non-linear torque calculations necessary for servo-control are performed. As a result, current loop processing is not impeded and servomotor control can be carried out in a highly precise manner.

5 Claims, 4 Drawing Sheets

ROBOT CONTROL APPARATUS FOR CONTROLLING A MANIPULATOR THROUGH A ROBOT ARM HAVING A PLURALITY OF AXES

BACKGROUND OF THE INVENTION

1. Field of the Invention

This invention relates to a robot control apparatus equipped with a special-purpose control processor for calculating the equivalent inertia of a robot arm load to adjust the loop gain of a servomotor.

2. Description of the Related Art

Horizontal articulated-type robots each of whose arms move in two dimensions have recently come into use for semiconductor device assembly and simple palletizing operations.

FIG. 3 is a simplified external view of an example of a horizontal articulated-type robot. As shown in the Figure, a manipulator 5 is provided on a wrist (hand) 4 at the distal end of a second arm 3. The second arm 3 is provided on the distal end of a first arm 2 so as to be freely pivotable in the horizontal direction. The first arm 2 is fixedly secured to the distal end of a post 1 so as to extend in the horizontal direction. The post 1 is provided on a base 11, which is installed on a floor, and is freely rotated by a drive motor. The first arm 2 accommodates a servomotor for rotating the second arm 3 back and forth, and the second arm 3 accommodates a servomotor for driving the wrist 4.

Numeral 6 denotes a variety of cables such as power cables for supplying power to the servomotors, and signal cables for transmitting signals from various sensors. Numerals 22, 32 denote covers for covering the first arm 2 and second arm 3, respectively. When the respective arm drive systems are subjected to maintenance or inspection, these covers are removed by way of mounting screws.

As shown in FIG. 4, the velocity control system of the the servomotor for driving the robot arms 2, 3 or wrist 4 constitutes a feedback control system which comprises a position and velocity control loop and a current loop and which responds to a input of a predetermined position command.

In the Figure, a position command signal formed by a main CPU, not shown, is altered into a predetermined position control signal by a servo-control circuit fore being sent to a servomotor together with an output signal of a current control loop constituted by a minor loop. A controller is connected to each servo-control circuit. A value indicative of the weight of the hand attached to the wrist 4 and values indicative of the weights of various workpieces gripped in accordance with motion of the manipulator are inputted to each controller from the main CPU. The servomotor controls the manipulator based on the applied control signal. At this time the rotational position of the load is sensed by a rotary encoder and is fed back to the servo-control circuit through a frequency-voltage converter (F/V). $K_1$ represents integration gain, and $K_2$ denotes proportional gain. The servomotor is provided for each axis, such as $\theta_1$ and $\theta_2$ axes, and the output signal from the rotary encoder for each axis is outputted to the aforementioned controller. The drive torque required for servomotor control is calculated, and a non-linear torque term is compensated by being fed forward to the servo-control circuit.

The torque command u of each servomotor is generally expressed by the following equation:

$$u = J(\theta)\ddot{\theta} + c(\theta, \dot{\theta}) + f(\dot{\theta}) + g(\theta) \quad \text{(a)}$$
$$= J(\theta)\ddot{\theta} + T(\dot{\theta}, \theta)$$

where $J(\theta)\ddot{\theta}$: equivalent inertia of the load
$c(\theta, \dot{\theta})$ : centrifugal force, Coriolis force
$f(\dot{\theta})$ : frictional force
$g(\theta)$ : gravitational force
$T(\dot{\theta})$ : overall non-linear torque In accordance with conventional servomotor control, the load driving servomotor for each axis, which is connected to and controlled by the main CPU, is provided with a servo-control circuit, and an auxiliary CPU is provided for deciding the non-linear torque, which varies in dependence upon displacement of the manipulator. The auxiliary CPU performs the calculations necessary for feed-forward compensation and forms control signals. Since this auxiliary CPU for a calculating drive torque is required seperately of arithmetic means provided for every servo-control circuit for the purpose of calculating the position command, the cost of the control apparatus is high and the control of data between the CPUs is complicated.

Each servo CPU calculates the equivalent inertia of the load and the non-linear torque required for controlling the servomotor in accordance with equation (a). At such time it is required that the CPU accept such information as the rotational angles about the other axes. In consequence, the current loop processing performed by each servo CPU is impeded and servomotor current control can no longer be carried out accurately.

Furthermore, the hand and workpeice weight values inputted to the controller in order for drive torque to be calculated for the servo-control circuit of each servomotor are preset in the control program of the main CPU. Therefore, when processing is executed with regard to a workpiece having a weight other than that stipulated, the operator must modify the program. This requires a great deal of labor.

SUMMARY OF THE INVENTION

The present invention has been devised to solve the aftermentioned problems of the prior art. The object is to provide a robot control apparatus in which a servo CPU for controlling each servomotor is provided and drive torque is calculated by these servo CPUs.

Another object of the invention is to provide a robot control apparatus in which an operator suitably inputs hand and workpiece weight values to a bus line interconnecting servo CPUs controlling respective servomotors, whereby drive torque is calculated.

Still another object of the invention is to provide a robot control apparatus in which information for every axis is stored in a shared RAM or the like and each servo CPU is capable of being accessed commonly.

In accordance with the present invention, there is provided a robot control apparatus for controlling the attitude of a manipulator through the intermediary of a robot arm having a plurality of axes, comprising servomotors of respective plural axes for driving the robot arm, a plurality of arithmetic means for calculating drive torques of respective servomotor control systems, and a bus line interconnecting the arithmetic means with one another for making it possible to access, from the arithmetic means, information relating to other axes necessary for drive torque calculation.

DETAILED DESCRIPTION OF THE PREFERRED EMBODIMENT

An embodiment of the invention will now be described in detail with reference to the drawings.

Figure 2:
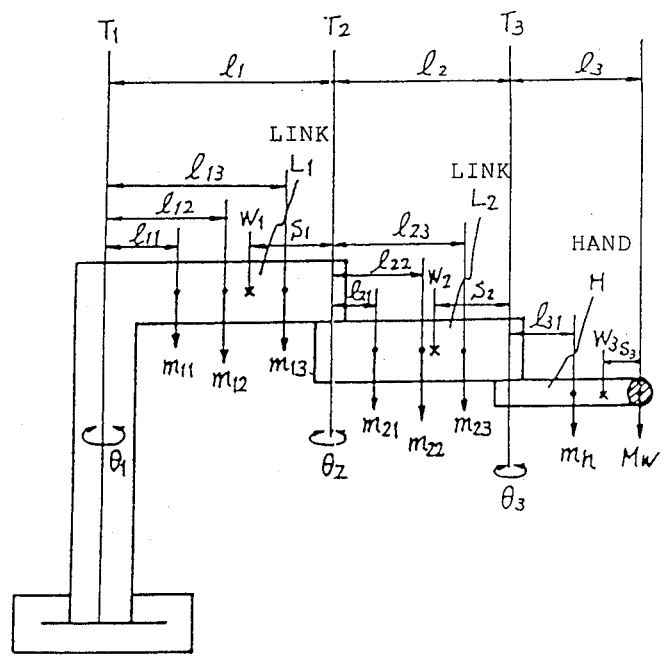
FIG. 2 is a view illustrating an example of the mechanism of a horizontal articulated-type robot.
Figure 3:
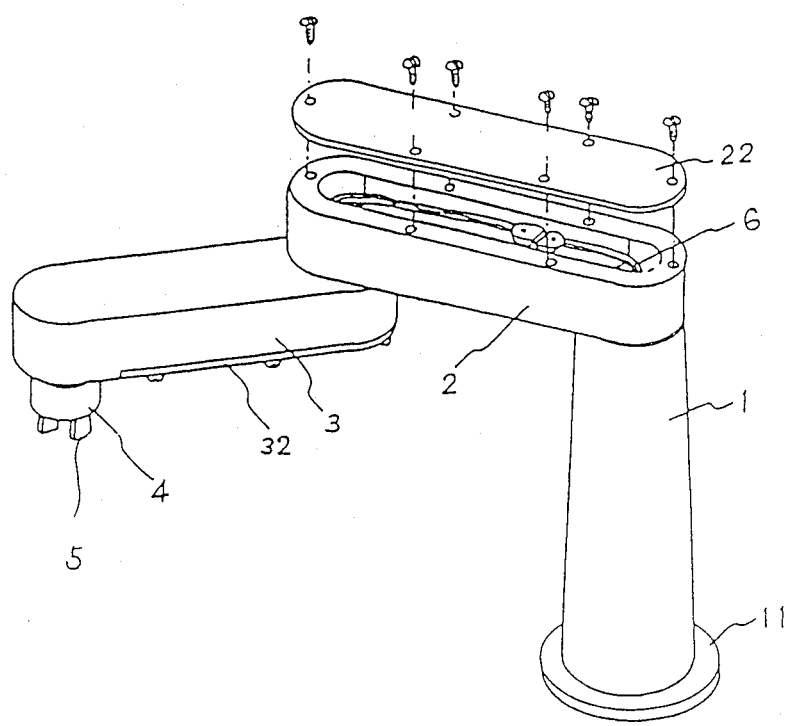
FIG. 3 is an external view of the same robot.
Figure 4:
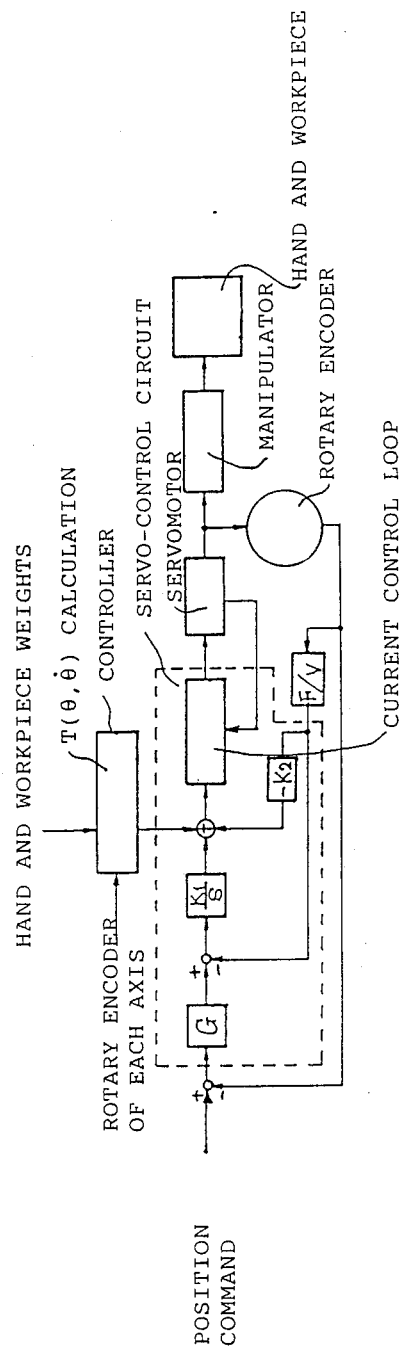
FIG. 4 is a block diagram showing the construction of a conventional apparatus.

FIG. 2 is a view illustrating the mechanism of a horizontal articulated-type robot having a link $L_1$ of length $l_1$, a link $L_2$ of length $l_2$, and a hand H of length $l_3$. The link L1 is rotatable about an axis $\theta_1$, the link $L_2$ about an axis $\theta_2$, and the had H about an axis $\theta_3$.

If the total weight of the link L1 is $M_1$ ($M_1 = m_{11} + m_{12} + m_{13}$), the total weight of link $L_2$ is $M_2$ ($M_2 = m_{21} + m_{22} + m_{23}$), the weight of the hand H and a workpeice W is $M_3$ ($m_3 = mh + Nw$), and the positions of the centers of gravity of the links $L_1$, $L_2$ and hand H are $W_1$, $W_2$, and $W_3$, respectively, then the torques $T_1$, $T_2$, $T_3$ along the various axes of the manipulator may be obtained as shown hereinbelow, where mij indicates the weights of the links $L_1$, $L_2$ and the weights of the servomotors as a system of particles.

The torque $T_3$ of the hand H about the $\theta_3$ axis is obtained as follows:

$$T_3 = K_1 \ddot{\theta}_3 + f_1(\theta_3)\ddot{\theta}_2 + f_2(\theta_2, \theta_3)\ddot{\theta}_1 + f_3(\theta_3)\dot{\theta}_2^2 + \quad (1)$$

$$f_4(\theta_2, \theta_3)\dot{\theta}_1^2 + f_5(\theta_3)\dot{\theta}_1\dot{\theta}_2$$

$$= (A^2 M_3 + J_{3yy})\ddot{\theta}_3 + (A^2 M_3 + A M_3 l_2 \cos\theta_3 + J_{3yy})\ddot{\theta}_2 +$$

$$\{A M_3 (A + l_2 \cos\theta_3 + l_1 \cos(\theta_2 + \theta_3) + J_{3yy})\}\ddot{\theta}_1 +$$

$$(A M_3 l_2 \sin\theta_3)\dot{\theta}_2^2 + \{A M_3 (l_2 \sin\theta_3 + l_1 \sin(\theta_2 + \theta_3))\}\dot{\theta}_1^2 +$$

$$(2 A M_3 l_2 \sin\theta_3)\dot{\theta}_1\dot{\theta}_2$$

The coefficient A is expressed as follows:

$$A = l_3 - S_3$$

The distance $S_3$ from the distal end of hand H to the position of the center of gravity of the hand H, when the hand is gripping a workpiece, is calculated as follows:

$$S_3 = (l_3 - l_{31}) mh/(mh + Mw) \ldots \quad (2)$$

$J_{3yy}$, obtained by expressing the inertia of the hand H about its center of gravity in coordinate system fixed with respect to the hand H, is written as follows:

$$J_{3yy} = mh(l_3 - l_{31} - S_3)^2 + MwS_3 \ldots \quad (3)$$

However, when the hand H is not gripping a workpiece, Mw is made zero in each of the above equations.

The torque $T_2$ of the link $L_2$ about the axis $\theta_2$ is obtained as follows:

$$T_2 = K_1' \ddot{\theta}_3 + f_1'(\theta_3)\ddot{\theta}_2 + f_2'(\theta_2, \theta_3)\ddot{\theta}_1 + f_3'(\theta_3)\dot{\theta}_2^2 + \quad (4)$$

-continued
$$f_4'(\theta_2, \theta_3)\dot{\theta}_1^2 + f_5'(\theta_3)\dot{\theta}_1\dot{\theta}_2 + f_6(\theta_3)(\dot{\theta}_3^2 + 2\dot{\theta}_2\dot{\theta}_3 + 2\dot{\theta}_3\dot{\theta}_1)$$

The torque $T_1$ of the link $L_1$ about the axis 01 is obtained as follows:

$$T_1 = f_7(\theta_2, \theta_3)(\dot{\theta}_1 + \dot{\theta}_2 + \dot{\theta}_3)^2 + f_8(\theta_2, \theta_3)(\dot{\theta}_1 + \dot{\theta}_2)^2 + \quad (5)$$

$$f_9(\theta_2, \theta_3)(\ddot{\theta}_1 + \ddot{\theta}_2 + \ddot{\theta}_3) + f_{10}(\theta_2, \theta_3)(\ddot{\theta}_1 + \ddot{\theta}_2) +$$

$$f_{11}(\theta_2, \theta_3)\ddot{\theta}_1 + f_{12}(\theta_2, \theta_3)\dot{\theta}_1^2$$

In these Eqs. (1), (4) and (5), the terms having $\ddot{\theta}_i$ represent the equivalent inertia of the load. These terms vary in dependence upon a change in the rotational angle $\theta_i$ about each axis.

Figure 1:
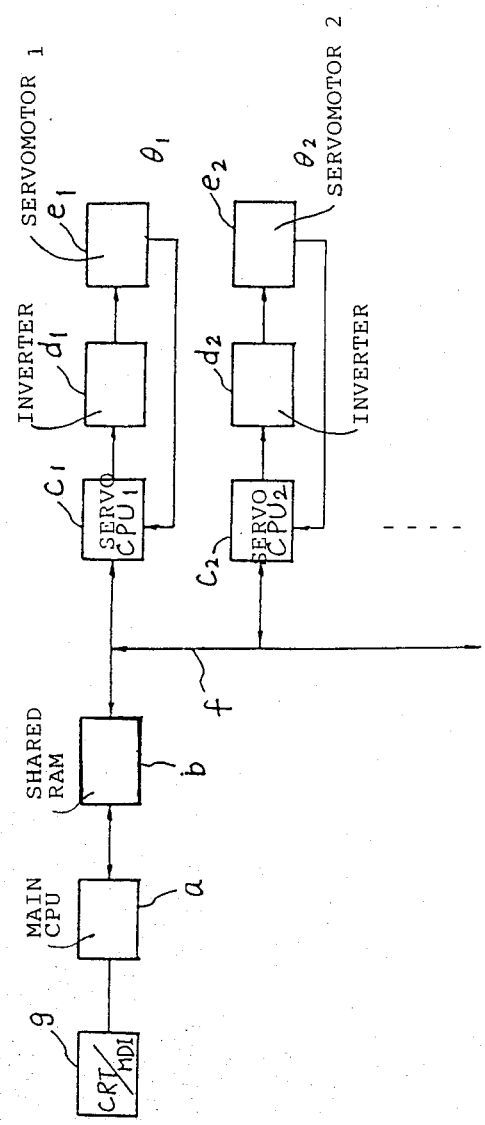
FIG. 1 is a block diagram illustrating the present invention.

FIG. 1 is a block diagram illustrating an example of a control system for a robot arm controlled by applying the apparatus of the present invention.

Control loops for a servomotor 1 for driving a load about a $\theta_1$ axis, a servomotor 2 for driving a load about a $\theta_2$ axis and so on are provided with respective servo CPUs c1, c2 which calculate a non-linear torque $T_i(\theta, \dot{\theta})$ ($i = 1, 2, \ldots$) about the respective axes. Each servo CPU is connected to a main CPU by a bus line F and is capable of executing, on line, equations of motion necessary for control along each axis in accordance with a control signal from the main CPU. Inverters $d_1$, $d_2$ control the currents of servomotors $e_1$, $e_2$.

In the present invention, a shared RAM b is connected between the main CPU a and each of the servo CPUs $c_1$, $c_2$. The plurality of servo CPU's $c_1$, $c_2 \ldots$ for controlling the loads driven about the axes $\theta_1$, $\theta_2 \ldots$ of the robot arms upon receiving a manipulator control command from the main CPU a are connected via a bus line f so as to be capable of accessing the RAM. The servomotors el, e2 are subjected to predetermined positioning control and current control by the servo CPUs $c_1$, $c_2$ and inverters $d_1$, $d_2$, respectively. The servo CPUs $c_1$, $c_2 \ldots$ calculate drive torques conforming to the position command signals based on the aforementioned control commands. Information relating to rotational angles about the other axes is inputted to each of the servo CPUs $c_1$, $c_2 \ldots$ for controlling the drive of the respective axes. These CPUs perform on-line processing for deciding torque commands in accordance with Eqs. (1), (4) and (5) and compensate the non-linear torque terms by feed-forward.

The aforementioned shared RAM b stores information about each axis. When a servo CPU does not perform current loop control, the RAM is capable of being accessed by the servo CPU $c_1$, $c_2 \ldots$ in order that the information may be read for the purpose of performing torque calculations. The shared RAM b can be used in the following manner.

When e.g. the torque $T_1$ about the $\theta_1$ axis is calculated by the servo CPU $c_1$ in accordance with Eq. (5), information relating to the other axes $\theta_2$, $\theta_3$ is stored in the shared RAM b. At the time when current loop processing is not performed by the servo CPU $c_1$, the shared RAM b is accessed, the information about the other axes is fetched and the predetermined processing is executed. Accordingly, even if read-in loss occurs dure to bus contention, current loop processing is not prevented and calculation of non-linear torque necessary for servomotor control can be carried out with assurance.

Also connected to the shared RAM b is a CRT/MDI g controlled by the operator so that the operator can confirm manipulator operation in the form of picture data. Hand and workpiece weight can be set in advance by the CRT/MDE g.

The operation of the apparatus of the invention will now be described.

After the main CPU a is operated and the system is started up, the operator inputs the weight of the robot hand and the weight of a workpiece to the shared RAM b from the CRT/MDI g via the main CPU a. When the main CPU a outputs position commands for the servomotors $e_1, e_2 \ldots$, the robot arm starts to move and information relating to the load about each axis is stored in the shared RAM b. Next, the servo CPUs $c_1, c_2 \ldots$ read the information for the other axes out of the shared RAM b at a time when current loop control is not being controlled, calculate the non-linear torque $T(\theta,\dot{\theta})$ on line in accordance with the Eqs. (1), (4) and (5), and perform feed-forward compensation with respect to the servo-control system.

It should be noted that since the weight value of the hand itself usually does not change, it may suffice to input solely the workpiece weight value.

Further, upon confirming by a CRT or the like that the robot hand has moved to the predetermined position, the operator can change the workpiece weight value and input the same as the occasion demands.

Thus, in accordance with the robot control apparatus of the present invention as described above, calculation of drive torque necessary for servomotor control is performed by each of the servo CPUs in a system where loads, which are rotated about a plurality of drive shafts of robot arms, are driven and controlled by manipulator driving servomotors in coordination with manipulator motion. As a result, it is unnecessary to provide auxiliary CPUs for drive torque calculation separately for every servo-control loop. This makes it possible to lower control loop cost.

Further, a RAM capable of being accessed commonly by the servo CPUs controlling the respective servomotors is provided. Information about the other axes is fetched from the RAM and non-linear torque is calculated when a servo CPU is not performing current loop processing. As a result, current loop processing is not impeded and the servomotors can be controlled very accurately.

In addition, the weight value of a workpiece gripped by the robot arm is modified, set and inputted to the servo CPUs at the required timing, and a drive torque calculation necessary for servomotor control is performed. Accordingly, the operator is readily capable of dealing with a change in workpiece weight value, and the system can be readily modified in so far as processing for various workpieces is concerned. As a result, when the robot control apparatus of the invention is applied to a horizontal articulated-type robot, much more accurate positional control becomes possible and the robot can be controlled at high speed and in a highly precise manner.

We claim:

1. A robot control apparatus for controlling the attitude of a manipulator through the intermediary of a robot arm having a plurality of axes, comprising:
    servomotors of respective plural axes for driving said robot arm;
    a plurality of arithmetic means, one for each of said servomotors, for calculating drive torques of respective servomotor control systems;
    a bus line interconnecting said arithmetic means so that one of said arithmetic means can access information from the rest of said arithmetic means relating to other axes necessary for drive torque calculation;
    memory means for holding information relating to each of the axes necessary for calculation of an equation of motion of said manipulator, said memory means being commonly accessible from each of said arithmetic means; and
    data input means for inputting, to prescribed ones of the arithmetic means, the weight of a hand at a distal end of said robot arm and the weight of a workpiece gripped by said hand,
    the robot arm having the plurality of axes being an arm of a horizontal articulated-type robot, each arm of which rotates in a horizontal plane.

2. A robot control apparatus according to claim 1, wherein said arithmetic means includes, for every axis of the robot arm, a servo microprocessor for performing feed-forward compensation of the servo-control systems of the servomotors.

3. A robot control apparatus for controlling the attitude of a manipulator through the intermediary of a robot arm having a plurality of axes, comprising:
    servomotors of respective plural axes for driving said robot arm;
    main processor means for providing position commands for each of said servomotors;
    a plurality of arithmetic means, one for each of said servomotors, for calculating drive torques of respective servomotor based on current loop control or, when current loop control is not being performed, based on load data for each of the axes;
    a bus line interconnecting said arithmetic means so that said arithmetic means can access information from each other for calculating the drive torques; and
    data input means for inputting to prescribed ones of said arithmetic means the weight of a hand at a distal end of said robot arm and the weight of a workpiece to be manipulated by the hand,
    the robot arm having the plurality of axes being an arm of a horizontal articulated type robot, each arm of which rotates in a horizontal plane.

4. A robot control apparatus according to claim 3, further comprising memory means for storing the load data necessary for calculating an equation of motion of the manipulator, said memory means being commonly accessible from each of said arithmetic means.

5. A robot control apparatus according to claim 3, wherein said arithmetic means includes, for every axis of the robot arm, a servo microprocessor for performing feed-forward compensation of the servomotors.

* * * * *

UNITED STATES PATENT AND TRADEMARK OFFICE
CERTIFICATE OF CORRECTION

PATENT NO. : 4,873,476
DATED      : OCTOBER 10, 1989
INVENTOR(S) : MITSUO KURAKAKE ET AL.

It is certified that error appears in the above-identified patent and that said Letters Patent is hereby corrected as shown below:

Col. 1, line 47, "fore" should be --before--.

Col. 3, line  6, "invention." should be --invention;--;
       line  9, "robot," should be --robot;--;
       line 21, "had" should be --hand--;
       line 25, "Nw)," should be --Mw),--.

Col. 4, line  5, "01" should be --θ1--;
       line 60, "the" should be --a--;
       line 64, "dure" should be --due--;

Col. 5, line  5, "CRT/MDEg." should be --CRT/MDIg.--.

Col. 6, line 44, "information" should be --the load data--.

Signed and Sealed this

Twenty-eighth Day of August, 1990

Attest:

HARRY F. MANBECK, JR.

*Attesting Officer*   *Commissioner of Patents and Trademarks*